US012025283B2

(12) United States Patent
Fedosik

(10) Patent No.: US 12,025,283 B2

(45) Date of Patent: Jul. 2, 2024

(54) HEADLAMP FOR A MOTOR VEHICLE

(71) Applicant: Hella GmbH & Co. KGaA, Lippstadt (DE)

(72) Inventor: Dmitry Fedosik, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/061,329

(22) Filed: Dec. 2, 2022

(65) Prior Publication Data

US 2023/0095603 A1 Mar. 30, 2023

Related U.S. Application Data

(63) Continuation of application No. PCT/EP2020/065269, filed on Jun. 3, 2020.

(51) Int. Cl.

*F21S 41/143* (2018.01)
*F21S 41/24* (2018.01)
*F21S 41/25* (2018.01)
*F21S 41/663* (2018.01)
*F21W 102/13* (2018.01)
*F21W 107/10* (2018.01)
*F21Y 115/10* (2016.01)

(52) U.S. Cl.

CPC ............ *F21S 41/143* (2018.01); *F21S 41/24* (2018.01); *F21S 41/25* (2018.01); *F21S 41/663* (2018.01); *F21W 2102/13* (2018.01); *F21W 2107/10* (2018.01); *F21Y 2115/10* (2016.08)

(58) Field of Classification Search

CPC .......... F21S 41/143; F21S 41/24; F21S 41/25; F21S 41/663

See application file for complete search history.

(56) References Cited

U.S. PATENT DOCUMENTS

| | | | | |
|---|---|---|---|---|
| 10,337,684 | B2 | 7/2019 | Joerg et al. | |
| 2017/0089536 | A1 | 3/2017 | Courcier et al. | |
| 2018/0328562 | A1* | 11/2018 | Taudt | F21S 41/25 |
| 2018/0370419 | A1* | 12/2018 | Danner | B60Q 1/24 |
| 2020/0003381 | A1* | 1/2020 | Liao | F21S 41/153 |
| 2020/0072428 | A1* | 3/2020 | Simchak | F21S 41/255 |

(Continued)

FOREIGN PATENT DOCUMENTS

| | | | |
|---|---|---|---|
| DE | 102016109132 | A1 | 11/2017 |
| DE | 102016109147 | A1 | 11/2017 |
| DE | 202017005367 | U1 | 12/2017 |

(Continued)

*Primary Examiner* — Christopher E Dunay

(74) *Attorney, Agent, or Firm* — Husch Blackwell LLP

(57) ABSTRACT

A headlamp for a motor vehicle is provided, the headlamp including a plurality of first light sources for a high beam, emitting light during operation of the headlamp, and a plurality of second light sources for a low beam, emitting light during operation of the headlamp. The headlamp also includes a first light guide having a plurality of light entry surfaces for the light emitted from the first light sources and a first light exit surface, as well as a second light guide having a plurality of light entry surfaces for the light emitted from the second light sources and a second light exit surface. An optical component is also provided, which may be a monolithic optical component, and which comprises both the first and the second light guide.

14 Claims, 2 Drawing Sheets

(56) References Cited

U.S. PATENT DOCUMENTS

| | | | | |
|---|---|---|---|---|
| 2022/0065416 A1* | 3/2022 | Qiu | ....................... | F21S 41/147 |
| 2022/0243893 A1* | 8/2022 | Qiu | ....................... | F21S 41/143 |

FOREIGN PATENT DOCUMENTS

| | | | |
|---|---|---|---|
| DE | 102018207063 | A1 | 11/2019 |
| DE | 102018125157 | A1 | 4/2020 |
| EP | 2306075 | A2 | 4/2011 |
| JP | 2018055907 | A | 4/2018 |
| WO | 2014032071 | A1 | 3/2014 |

* cited by examiner

HEADLAMP FOR A MOTOR VEHICLE

CROSS REFERENCE

This application claims priority to and is a continuation of PCT Application No. PCT/EP2020/065269, filed Jun. 3, 2020, the entirety of which is hereby incorporated by reference.

FIELD OF THE INVENTION

The present invention concerns a headlamp for a motor vehicle.

BACKGROUND OF THE INVENTION

A headlamp of the aforementioned type is known from DE 10 2016 109 147 A1. The headlamp described therein comprises a plurality of first light-emitting diodes (LEDs) for a high beam and a plurality of second light-emitting diodes for a low beam. The light-emitting diodes can be individually controlled to adapt the generated light distribution to the traffic situation, e.g. to avoid dazzling an oncoming vehicle. The headlamp also comprises a first light guide for the light emitted by the first light-emitting diodes and a second light guide for the light emitted by the second light-emitting diodes. The first and the second light guide are arranged separately from each other on a cooling and support body, the second light guide being arranged above the first light guide and further back in the direction of light propagation than the first light guide. The cooling and support body is L-shaped, the first light guide being attached to a first of the L-limbs and the second light guide to a second of the L-limbs. The headlamp further comprises a lens through which the light emerging from the light exit surfaces of the first and second light guides passes.

A disadvantage of such a headlamp is its complex design and the comparatively large overall depth of the headlamp.

BRIEF SUMMARY OF THE INVENTION

The problem underlying the present invention is the creation of a headlamp of the type mentioned above, which is simpler and/or requires less space.

A headlamp is provided comprising an optical component, in particular a monolithic optical component, which comprises both the first and the second light guide. This design allows the overall depth of the headlamp to be shortened. Furthermore, it results in easier assembly, especially because components can be integrated into each other. In addition, a reduction in weight can be achieved.

It may be provided that the optical component has a light exit surface formed by the light exit surfaces of the first and second light guides. In particular, the light exit surfaces of the first and second light guides are adjacent to and/or merge into one another. The optical component thus contributes both to the generation of the high beam and the low beam.

The headlamp may comprise means for generating a horizontal cut-off line.

In particular, the first light exit surface may be inclined to the second light exit surface. This makes it possible to ensure that the high beam and low beam are superimposed in the area of the horizontal cut-off.

It may be intended that the optical component serves as a primary optics.

Preferably, the optical component may have at least one collimating lens which is integrated in particular in the light exit surface of the optical component. By integrating a collimating lens into the primary optics, the efficiency of the headlamp can be increased. In particular, it may be provided that the exit surfaces of the light guides each have a collimating lens. In particular, these can be inclined relative to one another, which makes it possible to achieve that the high beam and the low beam are superimposed on one another in the area of the cut-off line.

It is possible that the light exit surface of the optical component has a structuring. By the structuring, the emerging light can be homogenized, which in particular avoids undesired local intensity maxima on components arranged behind the component.

It may be provided that the light entry surfaces are formed by the ends of light guide elements projecting from the component. These light guide elements, for example finger-shaped or trunk-shaped, can effectively receive the light emitted by the individual light sources and couple it into the optical component.

It is possible to control the first and/or the second light sources individually or in individual groups. In this way, the light distribution produced by the headlamp can be adapted to the traffic situation, e.g. to avoid dazzling an oncoming vehicle.

It may be provided that the light sources are designed as light-emitting diodes which are arranged in particular on a common circuit board. The arrangement of the light-emitting diodes on a common circuit board also contributes to making the headlamp more compact.

It is possible for the light sources to be arranged in a plane, in particular the arrangement of the light sources corresponding to the contour of the cut-off line. In contrast to the state of the art, the light sources of the high beam and low beam are therefore not offset from each other in the direction of light propagation, which also results in a more compact design. By arranging the light sources according to the contour of the cut-off line to be produced, the legally required contour is easier to realize.

It may be provided that the headlamp has a secondary optics through which the light emerging from the light exit surfaces of the first and/or the second light guide passes during operation of the headlamp. The secondary optics may have a collimating lens which is adapted, in particular with respect to its cutting width, to the at least one collimating lens of the optical component serving as a primary optics. By adjusting the cutting width of the collimating lenses of the primary and secondary optics, the collimation is effectively divided between the primary and secondary optics, so that the desired effect can be achieved with less effort.

It is possible that the secondary optics have a structuring which is arranged in particular on the collimating lens. By structuring the secondary optics, any artifacts generated by the structuring of the primary optics can be minimized.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

In the figures, identical and functionally identical parts are marked with identical reference symbols.

The illustrated version of a headlamp according to the invention comprises an unshown circuit board on which a plurality of light sources in the form of light-emitting diodes (LEDs) are arranged. In this case, both several first light sources designed as light-emitting diodes for a high beam and several second light sources designed as light-emitting diodes for a low beam are arranged on the board.

It is possible to use other light sources instead of the light-emitting diodes. For example, semiconductor lasers could also be used as light sources.

The light sources can be controlled separately to switch between low beam and high beam. It is also possible to implement other functions of an adaptive front lighting system by varying the power supply to the light sources, such as city lights, country lights or motorway lights. It is also possible to control the first and/or second light sources individually or in groups. In this way, the light distribution generated by the headlamp can be adapted to the traffic situation, e.g. to avoid dazzling an oncoming vehicle.

The illustrated design of a headlamp according to the invention further comprises an optical component 1 serving as a primary optics, in particular a monolithic optical component 1, and a secondary optics 2. During operation of the headlamp, the light emitted by the light sources passes first through the primary optics and then through the secondary optics 2 (see FIG. 1).

Figure 2:
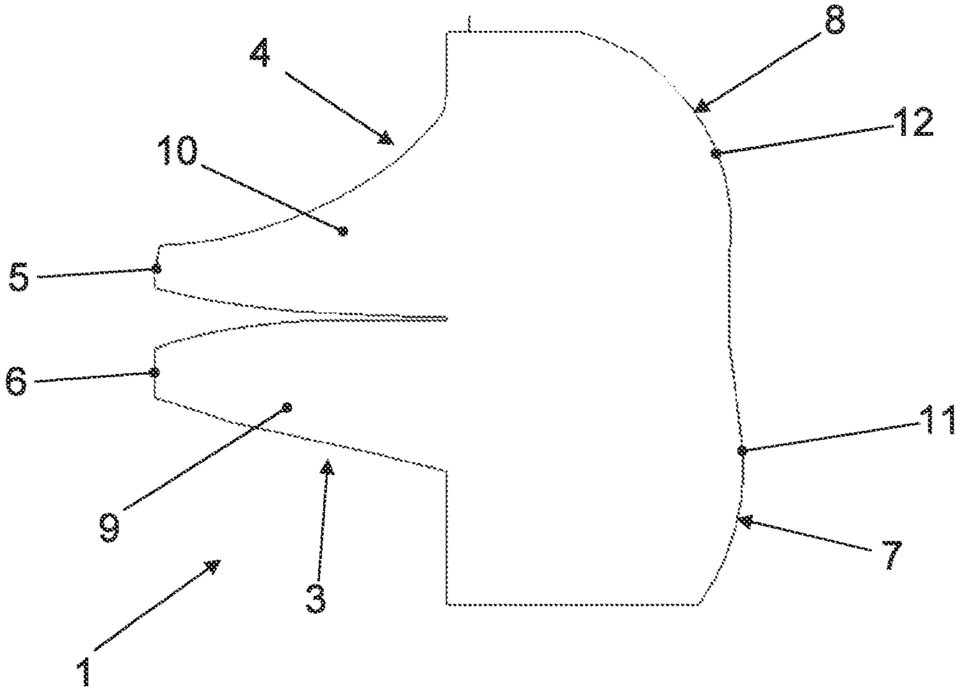
FIG. 2 is a side view of the primary optics of the headlamp as shown in FIG. 1.

The optical component 1, which serves as primary optics, comprises a first light guide 3 for the high beam and a second light guide 4 for the low beam (see FIG. 2). The light guides 3, 4 each have several light entry surfaces 5, 6 on their left side shown in FIG. 2, into which the light of the light-emitting diodes is coupled when the headlamp is in operation. On the right-hand side shown in FIG. 2 the light guides 3, 4 each have a light exit surface 7, 8 through which the light emerges.

Figure 3:
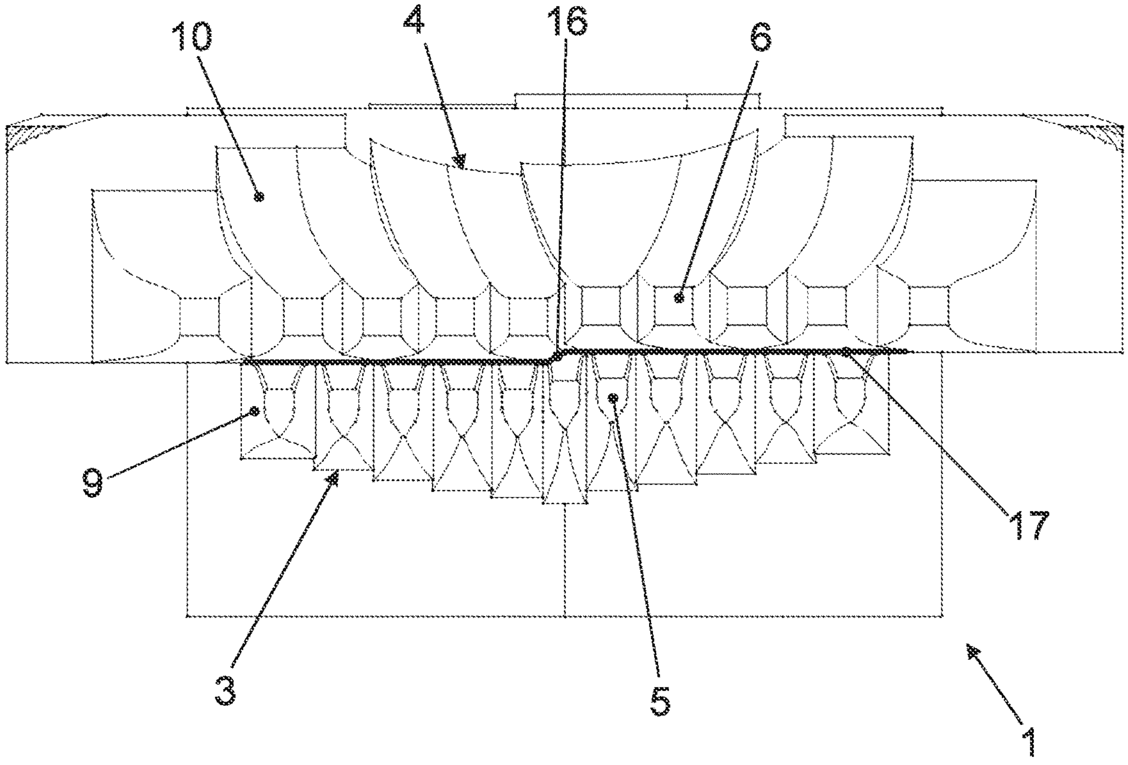
FIG. 3 is a front view of the primary optics of the headlamp as shown in FIG. 1.

The light guides 3, 4 each have a plurality of light guide elements 9, 10 which protrude from the light guides 3, 4 (see FIG. 2 and FIG. 3). The ends of the light guide elements 9, 10 facing away from the light guides 3, 4 form the light entry surfaces 5, 6. The light guide elements 9, 10 are essentially finger shaped or trunk shaped.

FIG. 2 illustrates that each of the light exit surfaces 7, 8 is curved so that two collimating lenses 11, 12 are formed on the optical component 1 serving as primary optics, each of which is assigned to one of the light guides 3, 4. These collimating lenses 11, 12 are inclined relative to one another, whereby it can be achieved that the high beam and low beam are superimposed on one another in the region of the cut-off line. The efficiency of the headlamp can be increased by integrating at least one collimating lens 11, 12 in the optical component 1.

Figure 1:
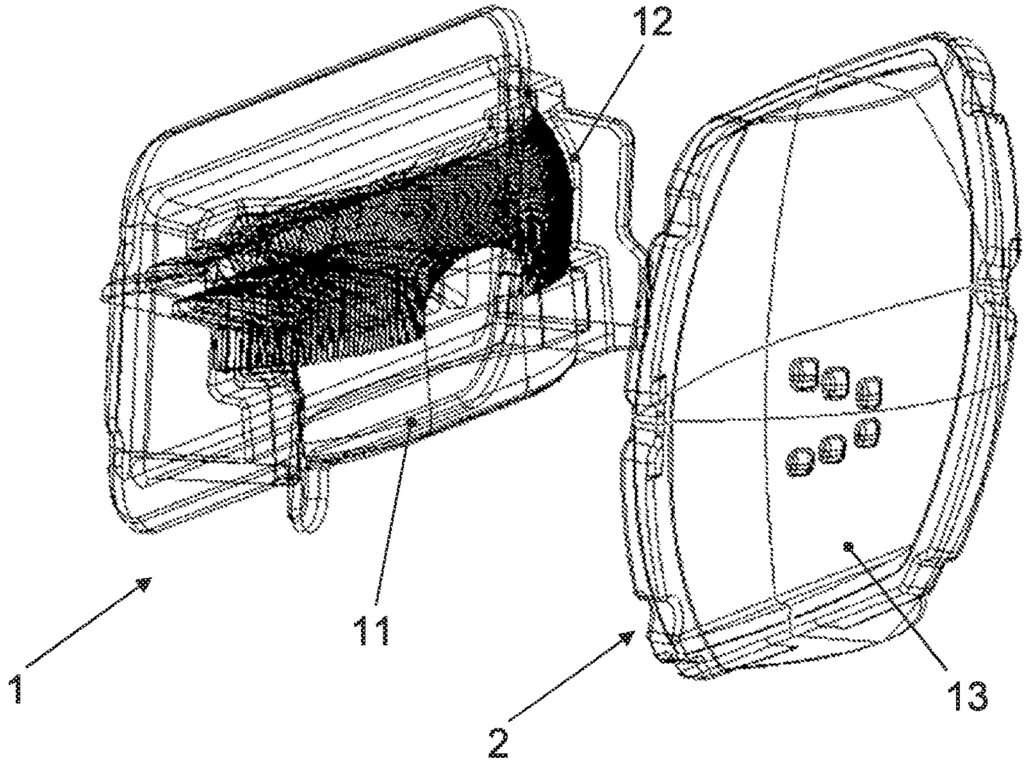
FIG. 1 is a perspective view of components of a headlamp of the invention.

The illustrated version of the secondary optics 2 also comprises a collimating lens 13, which is designed as a biconvex lens, for example (see FIG. 1). It is also possible to design the collimating lens 13 differently, for example as a plano-convex lens. The cutting width of the collimating lens 13 of the secondary optics 2 is adapted to the cutting widths of the collimating lenses 11, 12 of the primary optics.

The illustrated design of a headlamp according to the invention further comprises an unshown housing in or on which the optical component 1 serving as primary optics with the circuit board, the secondary optics 2 and a likewise unshown heat sink for the light emitting diodes arranged on the circuit board can be mounted.

Figure 4:
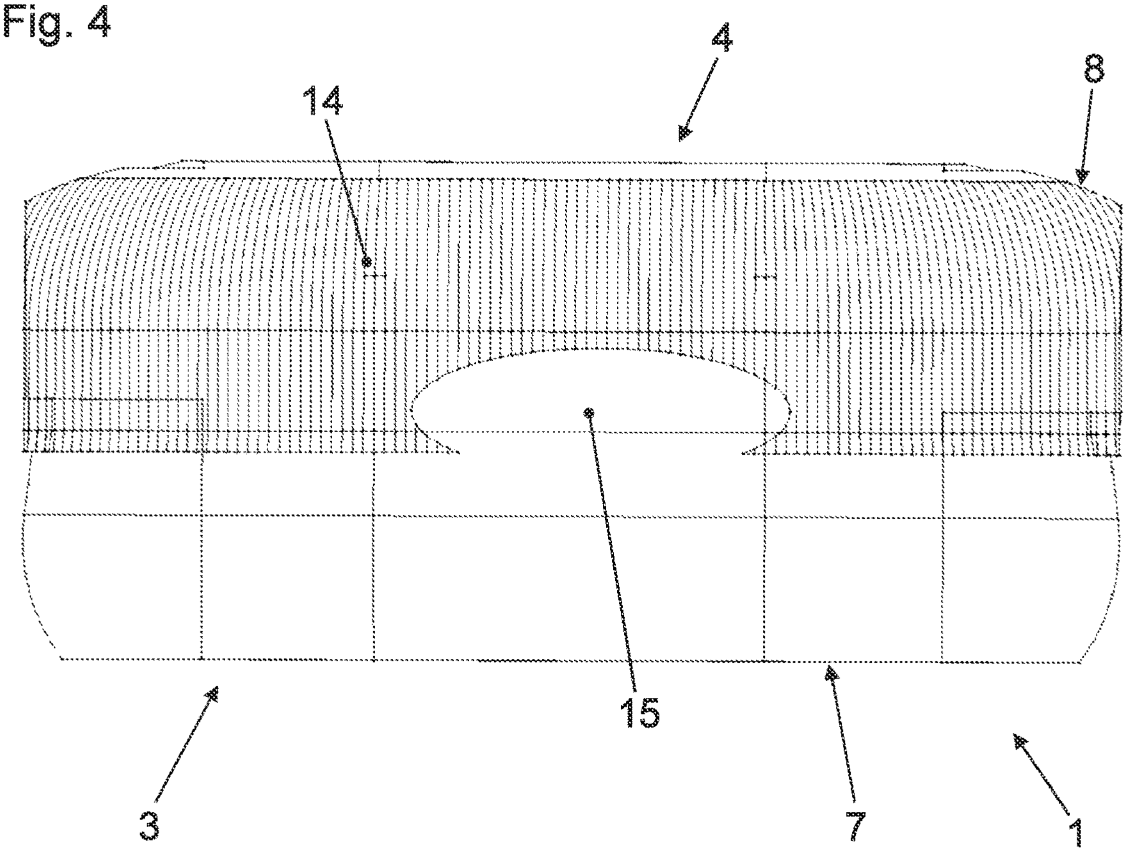
FIG. 4 is a rear view of the primary optics of the headlamp as shown in FIG. 1.

FIG. 4 illustrates that the light exit surface 8 of the second light guide 4 has a structuring 14. It is certainly possible to also provide the light exit surface 7 of the first light guide 3 at least partially with this or a comparable structuring 14. The structuring 14 can be designed as a prism array, for example. The structuring 14 homogenizes the light emerging from the light exit surface 8 at least to such an extent that no undesired intensity maxima occur on the secondary optics 2 and/or an unshown cover glass.

The structuring 14 is recessed in a middle area 15. The light can pass through this recessed area 15 relatively unhindered, so that higher light intensities can be achieved.

Furthermore, the collimating lens 13 of secondary optics 2 is also provided with an unshown structuring. This structuring of the secondary optics 2 can minimize artifacts generated by the structuring 14 of the primary optics.

FIG. 3 illustrates that eleven light entry surfaces 5 of the first light guide 3 and ten light entry surfaces 6 of the second light guide 4 are provided, each formed by the distal end of a light guide elements 9, 10. If a light source, for example in the form of a light-emitting diode, is arranged in front of each of the light entry surfaces 5, 6, eleven light sources for the high beam and ten light sources for the low beam would be provided.

However, it is quite possible to provide more or less light entry surfaces 5, 6 or more or less light guide elements 9, 10 on both the first light guide 3 and the second light guide 4.

FIG. 3 illustrates that the light entry surfaces 5 of the first light guide 3 each have essentially the same shape and size. Furthermore, it can be seen that the light entry surfaces 6 of the second light guide 4 each have essentially the same shape and size.

The light entry surfaces 5, 6 and thus also the light sources arranged in front of them have a vertical offset 16 in a central area. This offset 16 follows the contour 17 of the horizontal cut-off line drawn in FIG. 3 for clarification.

LIST OF REFERENCE SYMBOLS

1 Optical component
2 Secondary optics
3 First light guide
4 Second light guide
5 Light entry surface of the first light guide 3
6 Light entry surface of the second light guide 4
7 Light exit surface of the first light guide 3
8 Light exit surface of the second light guide 4
9 Light guide element of the first light guide 3
10 Light guide element of the second light guide 4
11 Collimating lens of the first light guide 3
12 Collimating lens of the second light guide 3
13 Collimating lens of the secondary optics 2
14 Structuring of the light exit surface 8
15 Recessed area of the structuring 14
16 Vertical offset of the light entry surfaces 5, 6
17 Contour of the horizontal cut-off line

I claim:

1. A headlamp for a motor vehicle, the headlamp comprising:

a plurality of first light sources for a high beam, emitting light during operation of the headlamp;

a plurality of second light sources for a low beam, emitting light during operation of the headlamp;

a first light guide having a plurality of light entry surfaces for the light emitted from the first light sources and a first light exit surface;

a second light guide having a plurality of light entry surfaces for the light emitted from the second light sources and a second light exit surface;

an optical component which comprises both the first and the second light guide;

wherein the plurality of light entry surfaces on the first light guide are positioned and located on a light entry plane;

wherein the plurality of light entry surfaces on the second light guide are positioned and located on the light entry plane; and wherein the light entry plane is oriented perpendicular to the light emitted from the plurality of first light sources and the plurality of second light sources.

2. The headlamp according to claim 1, wherein the optical component has a light exit surface formed by the light exit surfaces of the first and second light guides.

3. The headlamp according claim 1, wherein the light exit surfaces of the first and second light guides are adjacent to and/or merge into one another.

4. The headlamp according claim 1, wherein the headlamp comprises means for generating a horizontal cut-off line.

5. The headlamp according claim 1, wherein the first light exit surface is inclined to the second light exit surface.

6. The headlamp according claim 1, wherein the optical component serves as a primary optics.

7. The headlamp according claim 1, wherein the optical component has at least one collimating lens.

8. The headlamp according claim 1, wherein the light exit surface of the optical component has a structuring.

9. The headlamp according claim 1, wherein the light entry surfaces are formed by the ends of light guide elements projecting from the component.

10. The headlamp according claim 1, wherein the first and/or the second light sources can be controlled individually or in individual groups.

11. The headlamp according claim 1, wherein the light sources are light-emitting diodes.

12. The headlamp according claim 1, wherein the headlamp has a secondary optics through which the light emerging from the light exit surfaces of the first and/or the second light guide passes during operation of the headlamp.

13. The headlamp according to claim 12, wherein the secondary optics has a collimating lens which is adapted to the at least one collimating lens of the optical component serving as a primary optics.

14. The headlamp according to claim 12, wherein the secondary optics have a structuring which is arranged in particular on the collimating lens.

* * * * *